(12) United States Patent
Aben et al.

(10) Patent No.: US 10,235,796 B2
(45) Date of Patent: Mar. 19, 2019

(54) METHOD AND APPARATUS FOR SELECTION OF PERSPECTIVE ORIENTATION OF A TWO DIMENSIONAL ANGIOGRAPHIC IMAGE

(71) Applicant: Pie Medical Imaging B.V., Maastricht (NL)

(72) Inventors: Jean-Paul Aben, Limbricht (NL); Tom van Neerven, Eys (NL); Rianne Reinartz, Neerbeek (NL)

(73) Assignee: Pie Medical Imaging B.V., Maastricht (NL)

( * ) Notice: Subject to any disclaimer, the term of this patent is extended or adjusted under 35 U.S.C. 154(b) by 104 days.

(21) Appl. No.: 15/425,973

(22) Filed: Feb. 6, 2017

(65) Prior Publication Data

US 2017/0236326 A1 Aug. 17, 2017

(30) Foreign Application Priority Data

Feb. 11, 2016 (EP) .................................... 16155314

(51) Int. Cl.
*G06T 1/00* (2006.01)
*G06T 7/60* (2017.01)
(Continued)

(52) U.S. Cl.
CPC ............ *G06T 15/20* (2013.01); *G06T 1/005* (2013.01); *G06T 7/60* (2013.01); *G06T 11/008* (2013.01);
(Continued)

(58) Field of Classification Search
None
See application file for complete search history.

(56) References Cited

U.S. PATENT DOCUMENTS 9,129,418 B2  9/2015 Schormans et al.
2004/0082870 A1* 4/2004 Rudy ................... A61B 5/0402
600/509

(Continued)

FOREIGN PATENT DOCUMENTS

CN 1882950 A 12/2006
EP 2570079 A1 3/2013
(Continued)

OTHER PUBLICATIONS

"Anatomy-Based Registration of CT-Scan and Intraoperative X-Ray Images for Guiding a Surgical Robot", IEEE Transactions on Medical Imaging, vol. 17, No. 5, Oct. 1998, pp. 715-728.
(Continued)

*Primary Examiner* — Idowu O Osifade
(74) *Attorney, Agent, or Firm* — Gordon & Jacobson, P.C.

(57) ABSTRACT

Systems and methods provide guidance for selection of projection perspectives to utilize to obtain complementary combinations of projection images of an object. The systems and methods provide a first two-dimensional image of the object which has been obtained from a first perspective having a first spatial orientation with reference to a coordinate system. The systems and methods define a first parameter indicative of a degree to which candidate perspectives complement the first perspective, define at least one scale of values between first and second limits, the first and second limits are associated with first and second candidate perspectives having complementary and non-complementary relations to the first perspective. The systems and methods associate the values to the first parameter for the candidate perspectives and display indicia indicative of the values of the first parameter with reference to the coordinate system as guidance for selecting candidate perspectives.

27 Claims, 10 Drawing Sheets

(51) Int. Cl.
     *G06T 11/00*       (2006.01)
     *G06T 15/08*       (2011.01)
     *G06T 15/20*       (2011.01)

(52) U.S. Cl.
     CPC .... *G06T 15/08* (2013.01); *G06T 2207/10081* (2013.01); *G06T 2207/20108* (2013.01); *G06T 2211/404* (2013.01)

(56) References Cited

U.S. PATENT DOCUMENTS

| | | |
|---|---|---|
| 2007/0053481 A1 | 3/2007 | Boese |
| 2014/0112430 A1 | 4/2014 | Lee et al. |
| 2015/0351713 A1 | 12/2015 | Sato et al. |

FOREIGN PATENT DOCUMENTS

| | | |
|---|---|---|
| WO | WO2006075333 A2 | 7/2006 |
| WO | WO2007110796 A2 | 10/2007 |

OTHER PUBLICATIONS

Contour Matching using Epipolar Geometry, IEEE Transactions on Pattern Analysis and Machine Intelligence, vol. 22, Issue No. 4 (Apr. 2000), pp. 358-370 (Abstract).
3D+t/2D+t CTA-XA registration using population based motion estimates, Baka et al., Demirci, Lee, Radeva, Unal (eds): MICCAI-STENT 2012, pp. 64-71.

* cited by examiner

METHOD AND APPARATUS FOR SELECTION OF PERSPECTIVE ORIENTATION OF A TWO DIMENSIONAL ANGIOGRAPHIC IMAGE

CROSS-REFERENCE TO RELATED APPLICATIONS

The present application claims priority from EP Patent Application No. EP16155314.4, filed on Feb. 11, 2016, herein incorporated by reference in its entirety.

BACKGROUND

1. Field

The embodiments herein relate to a method and apparatus for determining optimal projection images of an object of interest, particularly angiographic images.

2. State of the Art

X-ray angiography is a commonly used imaging modality within a numerous variety of interventions. During the interventions, it is very important that the clinician achieves a good understanding of the object in question using a workflow that is as efficient as possible. That is, a method that is fast, reproducible and burdens the patient minimally.

During X-ray angiography several different two-dimensional images, also called two-dimensional projections, of the object under examination can be obtained from different views or perspectives by rotating the arm, holding the X-ray source and the image intensifier, with reference to the patient.

It is common practice to use two acquired two-dimensional angiographic images to generate a three-dimensional reconstruction for example a part of the vascular system. This three-dimensional reconstruction is then the basis for performing 3D quantitative analysis on (part of) a vessel of interest or for instance to perform computational fluid dynamic simulations.

Because the three-dimensional reconstruction is the basis for further calculations, it is important that the three-dimensional reconstruction is as accurate as possible. The choice of the two two-dimensional angiographic images is determinative for the accuracy of the three-dimensional reconstruction.

This is due to different aspects. First of all, the two two-dimensional images used to generate the three-dimensional reconstruction should contain as much information regarding the object of interest as possible.

Furthermore, the accuracy of the three-dimensional reconstruction is not solely dependent on the amount of information that is present in the two two-dimensional angiographic images, as the spatial angle between the two images is of importance. When the spatial angle between the two two-dimensional angiographic images is too small, the geometry of the vessel is unclear because the images contain roughly the same information regarding the object of interest.

At the moment, several methods have been proposed to determine optimal views or perspectives at which the clinician should acquire two-dimensional angiographic images to allow accurate 3D reconstruction. These optimal views are however determined using 3D information of the object of interest as described for instance in U.S. Pat. No. 9,129,418. In practice this means that a clinician acquires two two-dimensional angiographic images. These images are then used to generate a three-dimensional reconstruction which is subsequently used to determine the optimal perspective(s). It is not until after generating the three-dimensional reconstruction that the clinician obtains information on how optimal the two two-dimensional angiographic images are that were used to generate the three-dimensional reconstruction. If the used two two-dimensional images were not optimal, the clinician has to acquire a new two two-dimensional angiographic image and generate a new three-dimensional reconstruction or at least one according to the teachings of European patent application published with number EP2570079.

A large disadvantage of these approaches is that a 3D reconstruction of the object of interest is required to determine if the used two-dimensional projections are optimal. Because of this, a complete analysis of the images has to be performed before the initially chosen image projections can potentially be replaced with more optimal projections. This is time consuming and poses a burden on the patient in terms of more contrast fluid as well as more exposure to x-ray radiation.

There is therefore a need for a more efficient approach that optimizes the workflow for the clinician and reduces the burden to the patient.

SUMMARY

It is thus an object of the embodiments herein to provide a method to efficiently guide a user in selecting the optimal projection of a two-dimensional (two-dimensional) angiographic image before generating a three-dimensional reconstruction of the object of interest. This saves time, effort and is of less burden for the patient because there is no need to acquire an additional angiographic image that is more optimal.

In accordance with embodiments herein, systems, computer program products and computer implemented methods are provided for providing guidance for selection of projection perspectives to obtain complementary combinations of projection images of an object. The systems, program products and methods operate, under control of one or more computer systems configured with specific executable instructions, to:

a) provide a first two-dimensional image of the object which has been obtained from a first perspective having a first spatial orientation with reference to a coordinate system;

b) define a first parameter indicative of a degree to which candidate perspectives complement the first perspective;

c) define at least one scale of values between first and second limits, the first limit associated with a first candidate perspective having a complementary relation to the first perspective, the second limit associated with a second candidate perspective having a non-complementary relation to the first perspective;

d) associate the values to the first parameter for the candidate perspectives; and e) display indicia indicative of the values of the first parameter with reference to the coordinate system as guidance for selecting one or more candidate perspectives to utilize to obtain a combination of complementary projection images.

Optionally, candidate perspectives can be identified by coordinates, the first parameter being displayed in the form of a map where the indicia represent a color or grey value that is associated with combinations of the coordinates. Optionally, the first spatial orientation of the first perspective and a spatial orientation of the candidate perspectives are both expressed in the coordinate system and in a form of rotation and angulation of an x-ray machine that is configured to obtain the first two-dimensional image and at least one second two-dimensional image.

In accordance with embodiments herein, the systems, program products and methods further include calculating spatial angles between the first perspective and the corresponding candidate perspectives; associating each of the spatial angles with a value for the first parameter; defining a second parameter; projecting each of the candidate perspectives on the first image to obtain a set of candidate projected perspectives; determining a differential difference angle between each of the candidate projected perspectives and a reference line located on the first two-dimensional image; associating each of the differential angles with a value for the second parameter; combining the spatial angles and the differential angles for the corresponding candidate projected perspectives to form an output parameter; and displaying indicia indicative of a value of the output parameter with reference to the coordinate system as guidance for the selection of a desired second perspective.

Optionally, the projected perspectives are epipolar lines corresponding to each candidate perspective as projected on the first image. The organ may represent a tubular organ or comprises a region containing tubular organs, the reference line being the centerline of the tubular organ or organs. The organ may comprise a plurality of tubular organs, the reference line is the centerline of at least part of the tubular organs, a weighting function being defined to weigh the contribution of each organ to determine an average differential difference angle. The first parameter can correspond to spatial angles and the second limit can be one of i) at or less than 30° or ii) at or higher than 150°. The organ can comprise a plurality of organs, where the method further provides for inputting a 3D or 3D+t model of the organ to be used for associating values to the first parameter as a function of the degree of overlap between organs when second perspectives of the set are used to obtain corresponding projection images. The candidate perspectives can contain organ overlap with the first perspective are assigned least optimal projection values for the first parameter, while the candidate perspectives containing little or no overlap with the first perspective are assigned a most optimal projection value for the first parameter. The first parameter can represent at least one of a spatial angle parameter, a differential difference angle parameter and an overlap parameter. The angulation and rotation angles of the candidate perspectives are limited within a range of possible rotation and angulation angles of an apparatus used for acquiring the candidate projections.

In accordance with aspects herein, a method is provided for guidance for the choice of projection perspectives to obtain optimal projection images of an object (particularly an asymmetrical object), the method including:
  a) providing a two-dimensional image of the object which have been obtained from a first perspective having a first spatial orientation with reference to a system of coordinates;
  b) defining a set of second perspectives;
  c) defining a first parameter;
  d) defining at least one scale of values between a minimum and a maximum for the first parameter with the maximum value being associated to the most optimal perspective and the minimum to the least optimal perspective or vice versa;
  e) associating a value to the first parameter on such a scale for each of the second perspectives; and
  f) displaying the value of the first parameter with reference to the system of coordinates as guidance for the choice of an optimal perspective.

By suggesting to the user the two-dimensional angiographic image(s) which is (are) most optimal to be used with a first two-dimensional angiographic image, for example to allow further analysis such as three-dimensional reconstruction or computational fluid dynamics, the workflow for the clinician is optimized, particularly by providing an optimal projection map that contains for each possible angiographic projection a measure for how optimal that projection would be as a second projection.

The clinician can then decide which of the proposed optimal projections is best suitable for the current procedure. For instance, for some procedures certain projections are less favorable due to the practical applicability of the system angles. All that without the need to make any preliminary three-dimensional reconstruction.

Furthermore, to obtain a good understanding of the object of interest it is important that the clinician has a clear view of the object of interest. That is, a view that is minimally obstructed for instance due to overlap of surrounding vessels. In an X-ray angiographic image overlapping vessels cannot be distinguished due to superimposing and are therefore extremely cumbersome.

To an extent, embodiments can also take into account overlap of surrounding vessels.

Advantageously second perspectives can be identified by coordinates, the first parameter being displayed in the form of a map where a color or grey value is associated to combinations of the coordinates. Embodiments provide that the first spatial orientation of the first perspective is expressed in the form of rotation and angulation of the x-ray machine used for obtaining the first two-dimensional image and the spatial orientation of the second perspectives are expressed in the form of rotation and angulation angles in the same reference system. Angulation and rotation angles of the second perspective may be advantageously limited within a range of possible rotation and angulation angles of the apparatus used for acquiring projections according to the perspectives.

According to an embodiment, the method further includes:
  g) calculating the spatial angle between each perspective of the set and the first perspective;
  h) associating to each spatial angle a value to the first parameter;
  i) defining a second parameter;
  j) projecting each perspective of the set on the image to obtain a set of projected perspectives (for example, epipolar lines corresponding to each perspective of the set as projected on the image);
  k) determining a differential difference angle between each of the projected perspectives and a reference line located on the image, for example a centerline of a tubular organ (note that if the organ comprises a plurality of tubular organs, the reference line may advantageously be the centerline of at least part of the tubular organs; in this case a weighting function may be defined to weigh the contribution of each organ to determine an average differential difference angle);
  l) associating to each differential angle a value to the second parameter;
  m) combining the spatial angle and the differential angle in an output parameter; and n) displaying the value of the output parameter with reference to the system of coordinates as guidance for the choice of an optimal perspective.

The second parameter may be expressed in the same scale of values of the first parameter or a further scale of values between a minimum and a maximum may be defined for the second parameter. The maximum value is associated to the most optimal perspective and the minimum to the least optimal perspective or vice versa. For example, least optimal projection values for the first parameter are assigned to spatial angles less than 30° and higher than 150°, preferably less than 20° and higher than 160°, more preferably less than 15° and higher than 175° while least optimal projection values for the second parameter are assigned to differential angles less than 90° with 90° corresponding to the most optimal projection value and 0° to the least optimal projection value.

In one embodiment, the organ comprises a plurality of organs, and the method further builds or inputs a 3D or 3D+t model of the organ to be used for associating values to the first parameter as a function of the degree of overlap between organs when second perspectives of the set are used to obtain corresponding projection images. Perspectives containing organ overlap are, for example, assigned least optimal values with no overlap corresponding to the most optimal projection value of the parameter.

A registration may be advantageously performed between the two-dimensional mage and the three-dimensional model before assigning a value to the parameter. If the three-dimensional model is a 3D+t model, an embodiment provides for synchronizing two-dimensional angiographic images containing multiple heart phases with the heart phase using an ECG signal before registration.

All parameters defined above can be used alone or jointly in any combination between them. In an embodiment, a spatial angle parameter, a differential difference angle parameter and an overlap parameter are combined to obtain an output parameter to be displayed as guidance for the choice of an optimal perspective.

The method is typically performed by a data processing system with access to two-dimensional images of an object of interest obtained from different perspectives.

Embodiments herein also relates to a computer product directly loadable into the memory of a computer and comprising software code portions for performing the method as disclosed above when the product is run on a computer.

According to another aspect, embodiments herein also relate to an apparatus for acquiring two-dimensional projection images of a three-dimensional object. The apparatus comprises a data processing module programmed for performing the method according to the embodiments herein to determine perspectives for obtaining optimal projection images of the object.

Advantageously, the apparatus could be the same machine used for acquiring and/or reconstructing the image data. Particularly it is an angiographic apparatus of the monoplane, biplane, C-arm or L-arm type with X-ray source and image intensifier respectively located at opposite sides of the arm, the arm being movable at least according to a rotation angle and an angulation angle with reference to a patient to obtain two-dimensional images from different perspectives, the processing module being programmed to calculate rotation and angulation angles of the arm for obtaining optimal projection images.

According to an embodiment, the angiographic apparatus comprises actuating module to automatically or semi-automatically rotate the arm, and/or display module for providing to a user indications for manually rotating the arm, according to rotation and angulation angles calculated for obtaining an optimal projection image. Advantageously, among two perspectives having opposite viewing direction and therefore resulting in the same angiographic image, the processing means is programmed to select the one corresponding to a rotation and angulation angle within the range of possible rotation and angulation angles of the apparatus.

The processing module could be a processor or processors dedicated to perform the method described herein or, in a particularly advantageous configuration, the same, or part of the same, processing module that subtends the main image acquisition functionalities of the machine thus obtaining a very compact and powerful apparatus.

Further improvements of the present application will form the subject of the dependent claims.

BRIEF DESCRIPTION OF THE DRAWINGS

The characteristics of the embodiments herein and the advantages derived therefrom will be more apparent from the following description of non-limiting embodiments, illustrated in the annexed drawings.

DETAILED DESCRIPTION OF A PREFERRED EMBODIMENT

Figure 1:
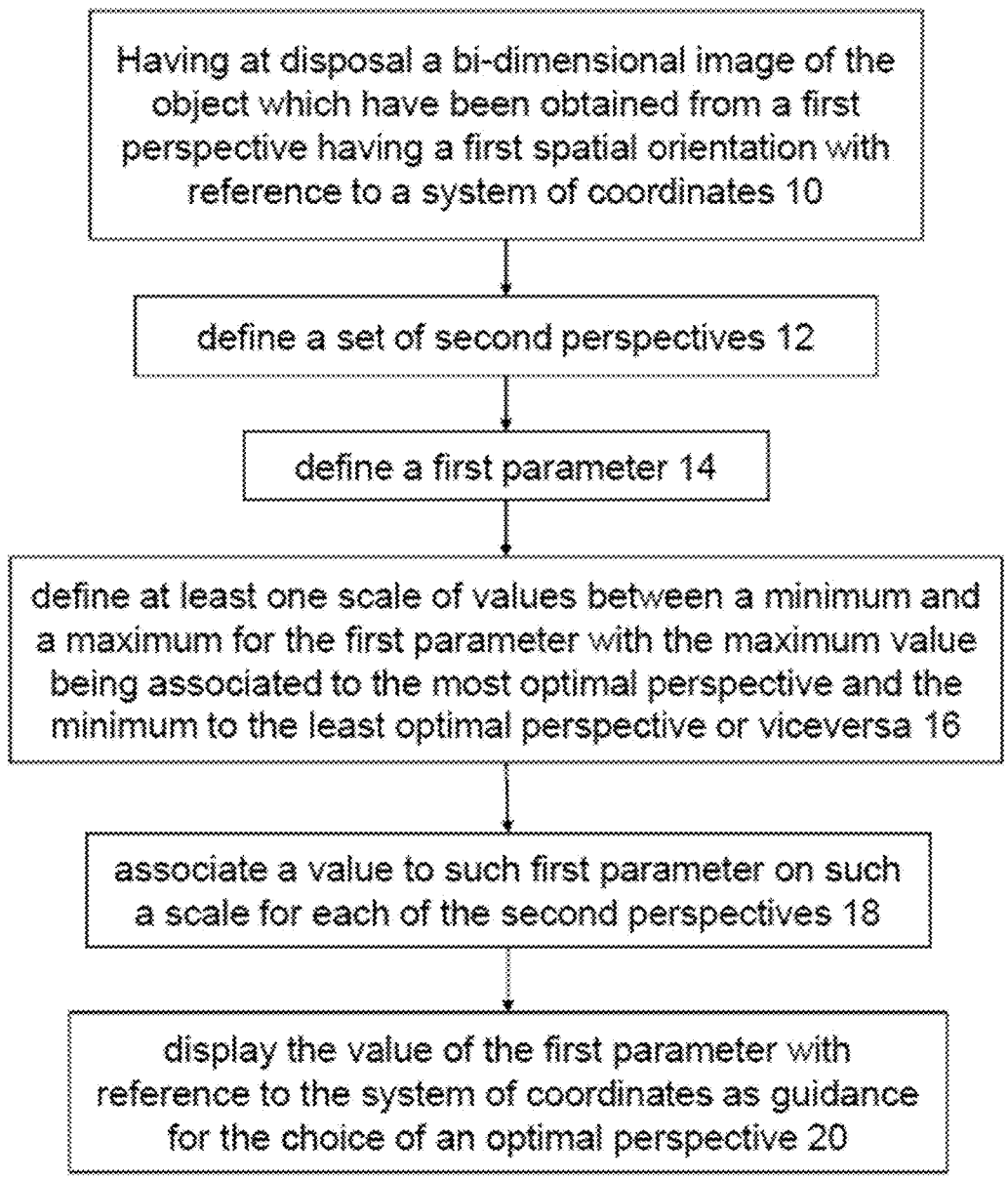
FIG. 1 shows a flowchart of a method for providing guidance for selecting projection perspectives performed in accordance with an embodiment.

FIG. 1 shows a flow chart illustrating the operations according to an embodiment of the present application. The operations employ an imaging system capable of acquiring and processing two-dimensional images of a vessel organ (or portion thereof) or other object of interest. For example, a single plane or bi-plane angiographic system can be used as those manufactured, for example, by Siemens (Artis zee Biplane) or Philips (Allura Xper FD).

Figure 10:
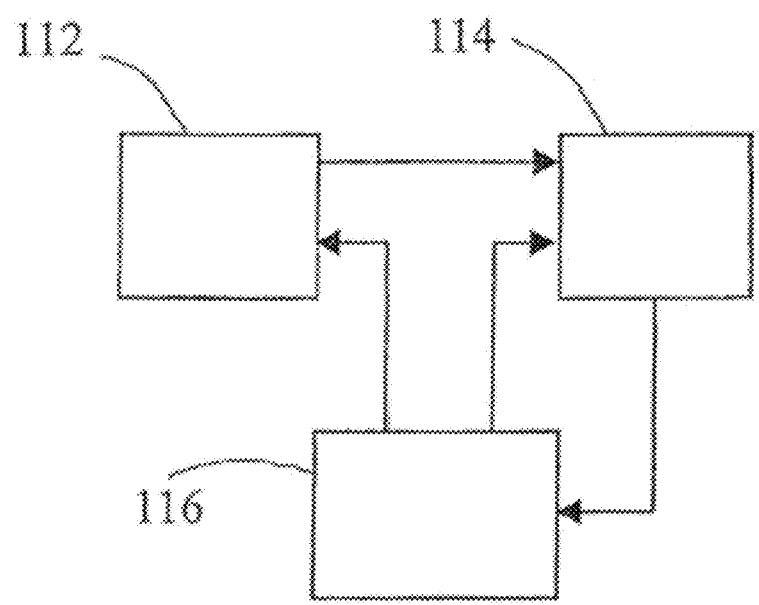
FIG. 10 shows a functional block diagram of an exemplary single plane angiographic system.

FIG. 10 is a functional block diagram of an exemplary single plane angiographic system, which includes an angiographic imaging apparatus 112 that operates under commands from user interface module 116 and will provide data to data processing module 114. The single plane angiographic imaging apparatus 112 captures a two-dimensional X-ray image of the vessel organ of interest for example in the postero-anterior (PA) direction. The single plane angiographic imaging apparatus 112 typically includes an X-ray source and detector pair mounted on an arm of a supporting gantry. The gantry provides for positioning the arm of the X-ray source and detector at various angles with respect to a patient who is supported on a table between the X-ray source and detector. The data processing module 114 may be realized by a personal computer, workstation or other computer processing system. The data processing module 114 includes one or more processors and memory that stores program instructions to direct the one or more processors to perform the operations described herein. The data processing module 114 also includes a display to present information to a user, such as the images, indicia, data and other information described herein and illustrated in the figures. The data processing module 114 also includes a user interface to receive inputs from the user in connection with operations herein, such as controlling operation of the imaging apparatus 112, selecting projection perspectives to be used when obtaining complementary images and the like. The data processing module 114 may correspond to or include portions of one or more of the systems described within the patents and publications referenced herein and incorporated by reference. The data processing module 114 processes the two-dimensional image captured by the single plane angiographic imaging apparatus 112 to generate data as described herein. The user interface module 116 interacts with the user and communicates with the data processing module 114. The user interface module 116 can include different kinds of input and output devices, such as a display screen for visual output, a touch screen for touch input, a mouse pointer or other pointing device for input, a microphone for speech input, a speaker for audio output, a keyboard and/or keypad for input, etc. The data processing module 114 and the user interface module 116 cooperate to carry out the operations of FIG. 1 as described below. The operations of FIG. 1 can also be carried out by software code that is embodied in a computer product (for example, an optical disc or other form of persistent memory for instance an USB drive or a network server). The software code can be directly loadable into the memory of a data processing system for carrying out the operations of FIG. 1.

In this example, it is assumed that the imaging system has acquired and stored at least one two-dimensional image (referred to herein as "projection image") of an object of interest according to a perspective IVD. Any image device capable of providing two-dimensional angiographic images can be used for this purpose. For example, a bi-plane or single plane angiographic system can be used as those manufactured, for example, by Siemens (Artis zee Biplane) or Philips (Allura Xper FD).

In step 10, the data processing module 114 is fed by a two-dimensional image I of the object which have been obtained from a first perspective IVD having a first spatial orientation with reference to a system of coordinates. For example, a processor of the data processing module 114 may access the imaging apparatus 112 to obtain the two-dimensional image I in real time while the imaging apparatus 112 is performing a scan of a patient. Optionally, the processor of the data processing module 114 may access memory to obtain one or more pre-recorded two-dimensional images I. As a further example, the processor of the data processing module 114 may access a database, server or other network accessible memory that includes prerecorded volumetric data sets for a patient. The image I obtained at 10 is referred to throughout interchangeably as a first image or base image or primary image.

In step 12, one or more processors of the data processing module defines a set of second/candidate perspectives JVD. The set of second/candidate perspectives may be defined manually by the user. Additionally or alternatively, the one or more processors may define the set of second/candidate perspectives automatically, such as based on predetermined perspective definition criteria (e.g., angles). Optionally the set of second/candidate perspectives may be automatically defined based upon the type of scanned being performed or the nature of the anatomy/object being analyzed.

At 14 a first parameter is defined. This can be for example a spatial angle, a differential angle, an overlap value or other criteria as defined and explained in details below with reference to the operations associated to FIGS. 2 and 8. The first parameter is indicative of a degree to which candidate perspectives complement a first perspective at which a first image was obtained. As explained herein, once a first image is obtained, alternative/candidate second images may be obtained that can be utilized with the first image in various manners, such as to generate a three-dimensional reconstruction of an object of interest. Each candidate second image has a corresponding candidate perspective along which the second image is obtained. The various candidate second images (and corresponding various candidate perspectives) complements the first image two different degrees/amounts. The relation between the first image/perspective and the candidate perspectives may be defined in various manners (e.g., spatial angle, differential angle, overlap value and the like).

At 16, one or more processors of the data processing module 114 defines at least one range/scale of values associated with the first parameter. The scale of values ranges between first and second limits. The first limit is associated with a first candidate perspective having a complementary relation to the first perspective of the first image, while the second limit is associated with a second candidate perspective having a non-complementary relation to the first perspective of the first image. For example, the first and second limits may correspond to a minimum and a maximum for the first parameter with the maximum value being associated to a complementary perspective (e.g. the most optimal perspective) and the minimum to a non-complementary perspective (the least optimal perspective) or vice versa. If the first parameter is a spatial angle between the first perspective and the candidate perspectives, the non-complementary perspective (e.g. least optimal projection) values for the first parameter may be, for example, assigned to angles at or less than 30° and at or higher than 150°, more particularly to angles at or less than 20° and at or higher than 160°. In case of the first parameter corresponding to a differential angle, the non-complementary perspective (e.g. optimal projection) values may be assigned, for example, to differential angles less than 90° with 90° corresponding to the most optimal projection value and 0° to the least optimal projection value. If the parameter corresponds to an overlap value, candidate perspectives containing organ overlap with the first perspective may be, for example, assigned non-complementary (e.g. least optimal) values, while candidate perspectives containing no overlap with the first perspective may be assigned complementary (e.g. the most optimal projection) value of the parameter.

At 18, the one or more processors of the data processing module 114 associates a value to the first parameter on the so defined a range/scale for each of the second/candidate perspectives. For example, when ten separate candidate perspectives are defined at 12, each of the candidate perspectives is assigned a separate scale value for the first parameter to indicate a degree to which the corresponding candidate perspective represents a complement or non-complement to the first image. Continuing with the above example, when the first parameter represents spatial angle, a candidate perspective having a spatial angle of 25° relative to the first perspective of the first image would be assigned a scale value indicative of a non-complementary relation between the candidate and first perspectives. Alternatively, when a candidate perspective has a spatial angle of 70° relative to the first perspective of the first image, the candidate perspective may be assigned a scale value indicative of a complementary relation between the candidate and first perspectives. As described herein, the scale values may be indicated through various types of indicia, such as numerical values, bar charts, graphs, color-coding over a map, variations in grayscale over a map and the like.

At 20, the value of the first parameter with reference to the system of coordinates as guidance for the choice of an optimal perspective is shown on a display for the user to make the final choice/selection. For example, the display of the data processing module 114 may present a map containing indicia indicative of the scale values for the first parameter with reference to a coordinate system. The indicia afford guidance for the user to select one or more candidate perspectives to utilize to obtain one or more secondary images that, when joined with the first image, provide a combination of complementary projection images.

In accordance with the process described in connection with FIG. 1, a computer implemented method is provided for guidance for selection of projections perspectives in connection with obtaining one or more secondary images that complement the first/primary image. Optionally, a user may select more than one secondary image. Optionally, once a secondary image/perspective is identified, the foregoing process may be repeated yet again utilizing the secondary image/perspective as a new first or primary image/perspective. When a new first or primary image perspective is identified, the operations at 12-20 may be repeated to identify a new or additional secondary images/perspectives in an iterative manner.

Figure 2:
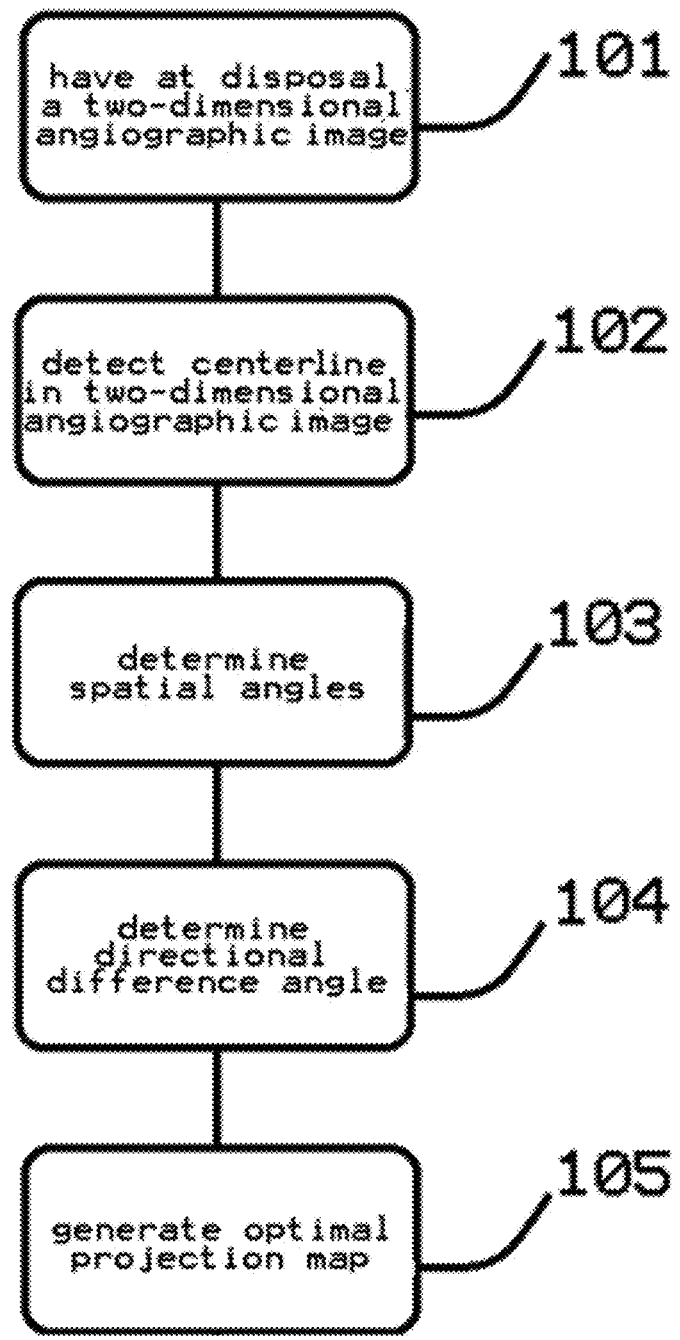
FIG. 2 shows a flowchart of a method for providing guidance for selecting projection perspectives in accordance with an alternative embodiment.

A further embodiment is now disclosed with reference to FIG. 2.

In this example, it is assumed to have at disposal a two-dimensional angiographic image (I) of an object of interest (at 101). For example, the two-dimensional angiographic image data may be obtained in real time from an angiographic imaging system. Optionally, prerecorded two-dimensional angiographic image data may be obtained from a local memory, a database, a network server or otherwise. This two-dimensional angiographic image (I) may advantageously contain multiple frames covering multiple heart phases. Any image device capable of providing two-dimensional angiographic images can be used for this purpose. For example, a bi-plane or single plane angiographic system can be used such as those manufactured, for example, by Siemens (Artis zee Biplane) or Philips (Allura Xper FD). In the two-dimensional angiographic image, or in one of the frames of the two-dimensional angiographic image sequence, a centerline of a segment of interest is indicated as shown in step 102 of FIG. 2. This can be done manually by the user or automatically by methods well known in the art.

In order to be able to guide the user in the selection of the second two-dimensional angiographic image, the processor of the data processing module 114 performs operations to determine a degree to which each candidate/possible projection J complements the first or primary projection I.

By way of example, the degree to which candidate projections J complement the first/primary projection I is determined by calculating two parameters for each candidate/possible projection.

At 103, the processor of the data processing module 114 calculates first the spatial angle between each candidate projection J and the first/primary projection I.

Figure 3A:
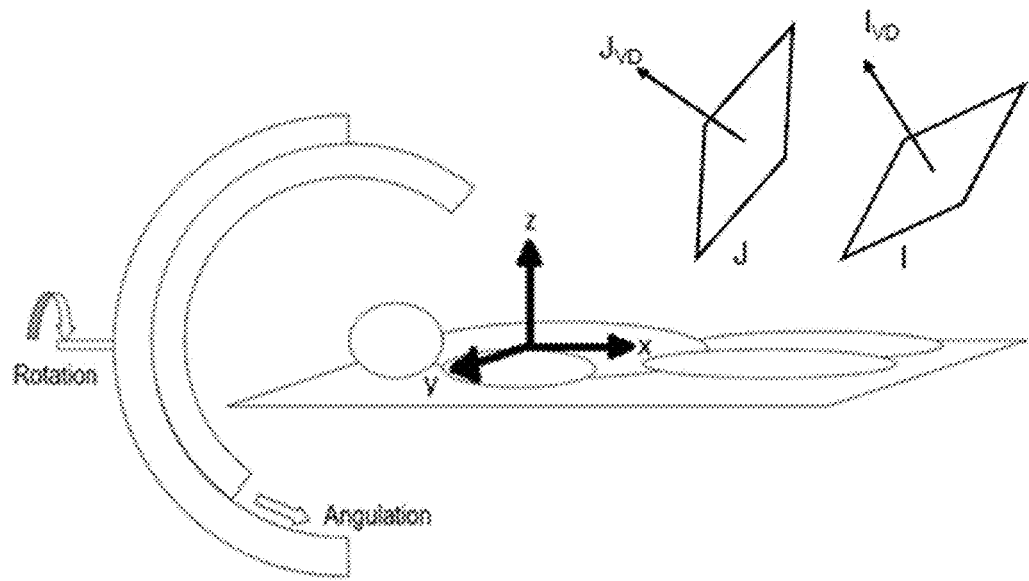
FIG. 3a shows the rotation and angulation movement of an X-ray system with indicated a reference system, the planes containing projection I and projection J and the corresponding normal vectors identifying the perspectives or viewing directions IVD, JVD from which the projections are taken.

Each two-dimensional candidate projection J is usually associated to a certain rotation and angulation value identifying the orientation of the X-ray machine used for obtaining it and thus the perspective JVD from which the projection is seen. In C-arm machines, the X-ray source is under the table and the image intensifier is directly above the patient. The body surface of the patient that faces the image intensifier (or flat panel) determines the specific view. This relationship holds true whether the patient is supine, standing, or rotated. To obtain an oblique (angulated from the perpendicular) view, the C-arm is rotated such that the image intensifier is positioned toward the patient's right (RO—Right Anterior Oblique view) or left (LO—Left Anterior Oblique view) shoulder or toward the head (CR—Cranial view) or the feet (CA—Caudal view) as shown in FIG. 3a. The angles by which a left-right movement of the machine, with respect to the patient, can be defined are called rotation angles. The angles by which a movement toward the head or the feet of the patient can be defined are called angulation angles.

The perspective, or viewing direction, of the X-ray machine resulting from a particular projection I, J is dependent on the rotation and angulation angle of the C-arm and can be expressed as a three-dimensional (3D) unit vector IVD, JVD. When defining rotation as a rotation around the x-axis and angulation as a rotation around the y-axis of a 3D coordinate system as can be seen in FIG. 3a, the coordinates (x, y, z) of the unit vector are:

This is done for each candidate/possible projection J as well as for the first/primary projection corresponds to I.

Figure 3B:
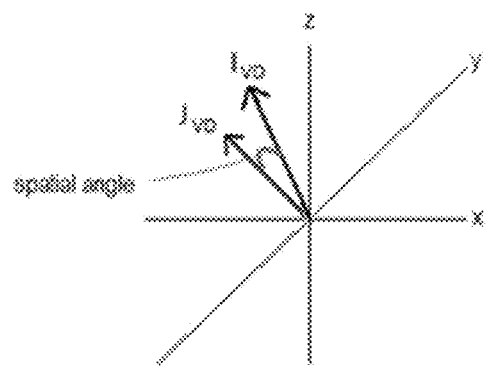
FIG. 3b shows the spatial angle between the viewing direction IVD of projection I and JVD of projection J.

The spatial angle between a certain projection J and projection I is the three-dimensional angle between the two corresponding viewing directions JVD and IVD as can be seen in FIG. 3b. This three-dimensional angle may be calculated, for example, using the dot product of the two corresponding normal vectors divided by the Euclidian norm of the vectors, for example as follows.

Figure 4:
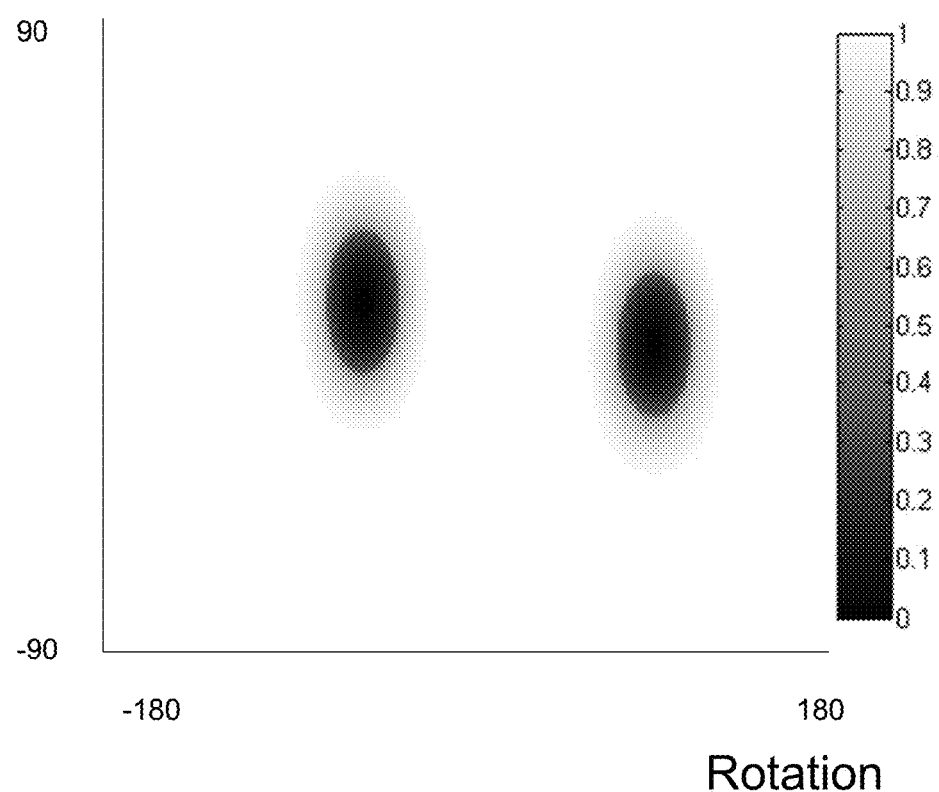
FIG. 4 shows an example of an optimal projection map based on spatial angle where the value 1 is most optimal.

An example of the outcome of the spatial angle determination between an image I and each candidate/possible other projections J can be seen in FIG. 4. In FIG. 4 an example of the outcome is shown as a color map. The x-axis of FIG. 4 shows the rotation angles of the X-ray apparatus. The y-axis of FIG. 4 shows the angulation angles of the X-ray apparatus. For all combinations of rotation and angulation angles of the X-ray apparatus, that is all possible projections J, the spatial angle between projection J and projection I is calculated as described above.

In this example, all candidate projections resulting in a spatial angle less than 30 degrees and larger than 150 degrees relative to first/primary projection I have been determined to be non-complementary (e.g. non-optimal), and are depicted black in the color map of FIG. 4. While all projections resulting in a spatial angle larger than 30 degrees and smaller than 150 degrees are determined to be complementary (e.g. optimal) and are depicted white in the color map of FIG. 4.

At 104, the processor of the data processing module 114 calculates a second parameter, e.g. the directional difference angle for each candidate/possible projection J.

For doing that, at 102 the processor firstly detects a reference line in the two-dimensional angiographic image I. Any type of reference line can be used for the purpose. In the example herein described the reference line is a centerline of the object of interest, typically a vessel.

For each point of the reference line, the direction vector of the line at that point is thus determined. In case of a centerline, this can be done for instance by constructing a straight line between a centerline point and the next centerline point.

Then the processor, for the current reference point, projects the corresponding epipolar line corresponding to a particular second projection J onto the two-dimensional angiographic image as described by Han, "Contour matching using Epipolar Geometry", IEEE Transactions on pattern analysis and machine intelligence, Vol. 22, No. 4 (2000), p 358-370. Han teaches that between any two images (or, equivalent, any two camera systems) there is an epipolar geometry. Match candidates between two images are established using a correlation-based technique. The complete subject matter of the publication referenced herein is incorporated by reference herein in its entirety.

Figure 5:
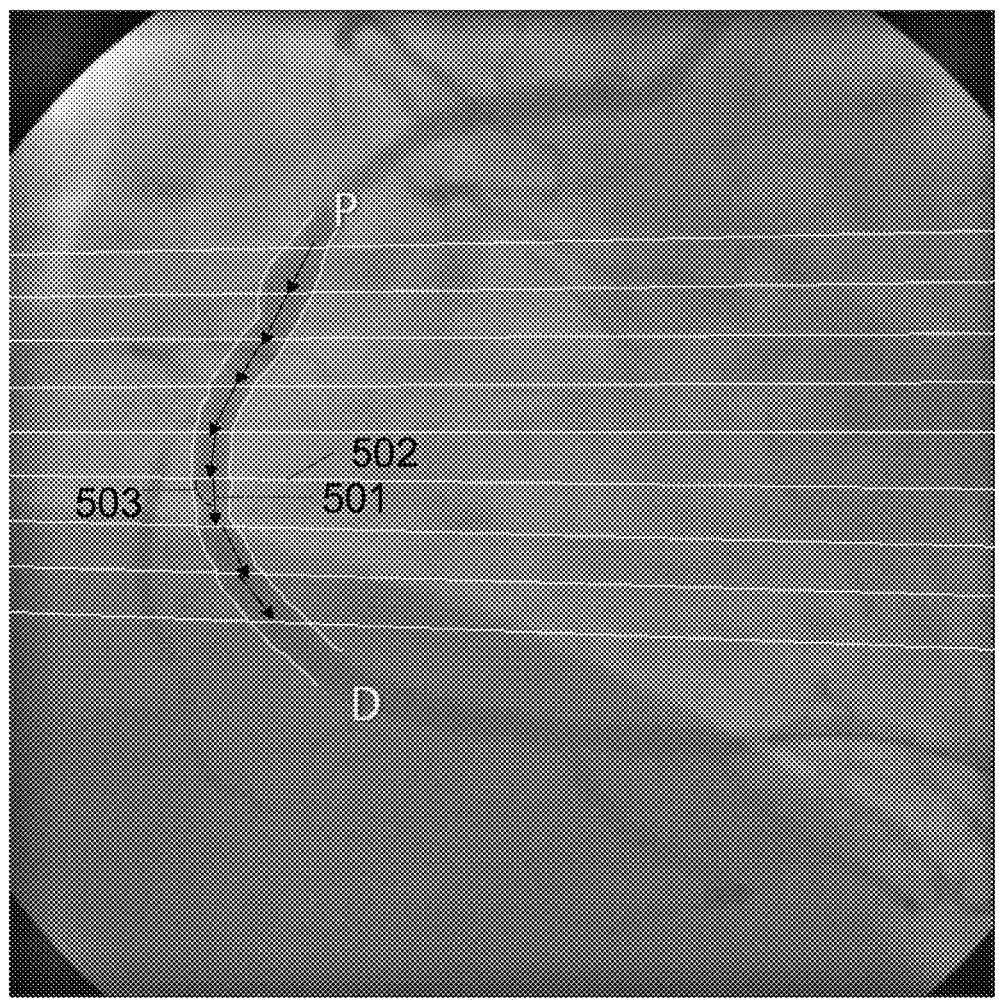
FIG. 5 shows an example of the epipolar lines and the direction vectors for the centerline points.

At 104, the processor of the data processing module 114 determines the directional difference angle between the epipolar line per image projection J based on the rotation and the angulation and the direction vector of the reference line as can be seen in FIG. 5. Each reference line point has a direction vector 501, from the current reference line point to the next and an epipolar line 502 belonging to the reference point. The difference angle 503 is determined between 501 and 502. This is done for each reference line point. Of all the determined angles, an average angle is then determined. When the difference angle approaches perpendicularity as for example 503 in FIG. 5, the projection is optimal. The more the difference angle deviates from perpendicularity, the less optimal the projection is. This average directional difference angle is then normalized.

In the case of a bifurcation, vessel tree or multiple single vessels, for each branch or vessel, the normalized average directional difference angle is calculated. To obtain one normalized directional difference angle for the projection, the normalized average directional difference angles of each branch or vessel are weighed using a weighting function. A weighting function is a function that calculates the contribution of, in this case the normalized average directional difference angles, to the total result based on for instance the diameter of the vessel.

Figure 6:
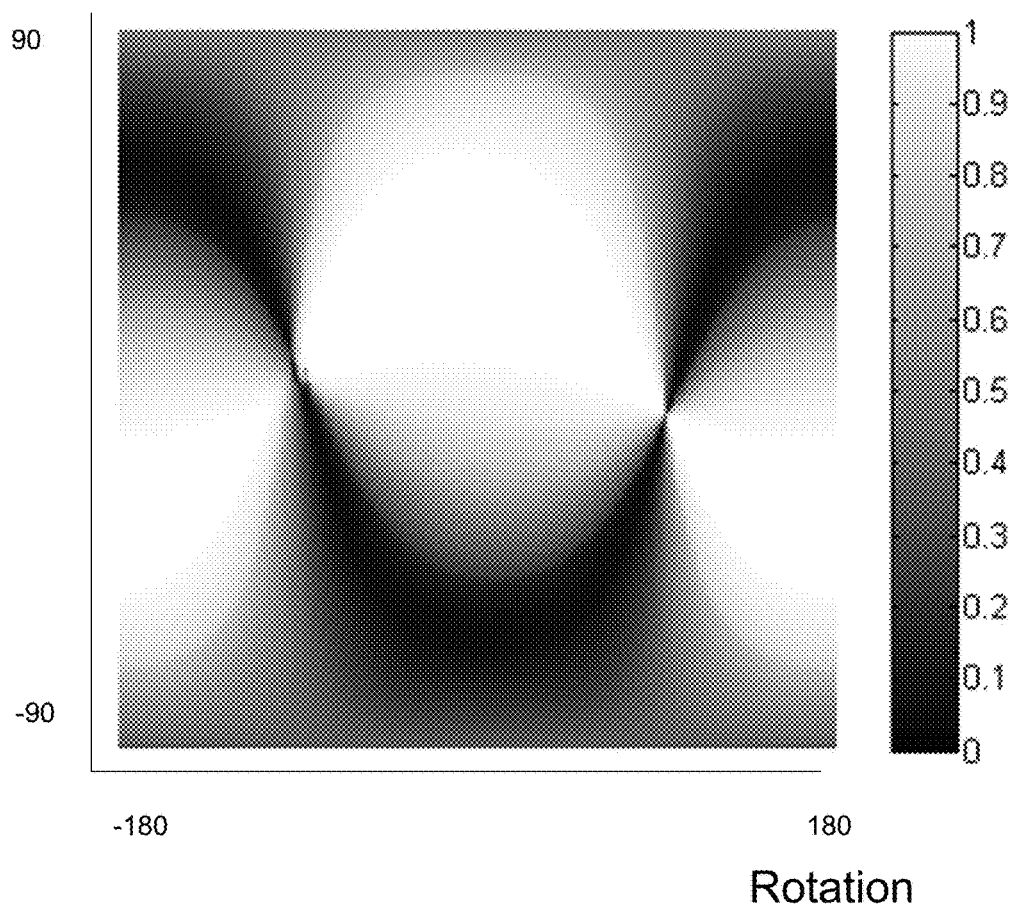
FIG. 6 shows an example of an optimal projection map based on directional difference angle where the value 1 is most optimal.

An example of an optimal projection map for the directional difference angle can be seen in FIG. 6. The x-axis of FIG. 6 depicts the rotation angles of the X-ray apparatus, while the y-axis of FIG. 6 depicts the angulation angles of the X-ray apparatus. For all combinations of rotation and angulation angles of the X-ray apparatus, that is all possible projections J, the normalized average directional difference angle between projection J and projection I is calculated as described above.

In this example, all candidate projections resulting in a directional difference angle approaching perpendicularity to the first/primary projection I have been determined to be complementary (e.g. optimal), and are depicted white in the color map of FIG. 6, for example for the projection J with an angulation of 30 and a rotation of 0. While all projections resulting in a small directional difference angle are determined to be non-complementary (e.g. non-optimal) and are depicted black in the color map of FIG. 6, for example for the projection J with an angulation of 35 and a rotation of −180.

To obtain one measure for how optimal a certain projection is, the normalized spatial angle and the normalized directional difference angle are advantageously combined by the processor at 105 into one overall parameter through a weighting function. For example, for each possible projection the overall parameter has a value between 0 and 1 where 0 is least optimal and 1 is most optimal. Obviously, each of the two parameters can also be used separately.

Figure 7:
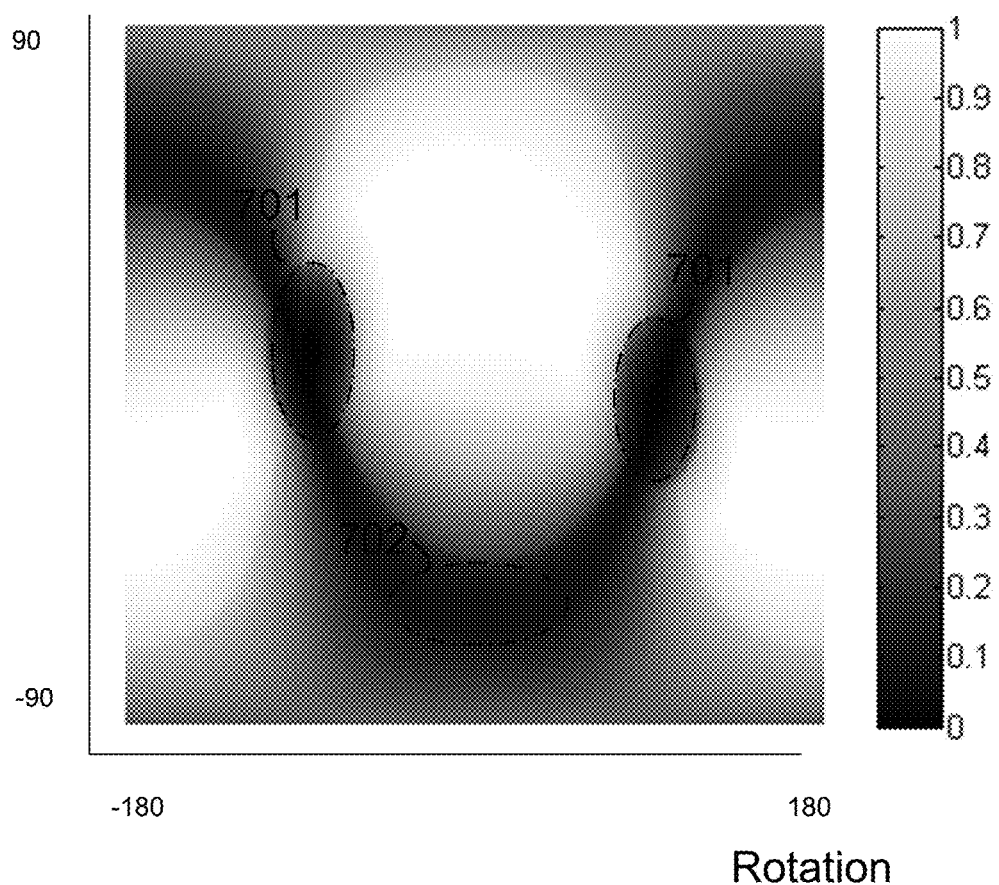
FIG. 7 shows an example of an optimal projection map based on spatial angle and directional difference angle where the value 1 is most optimal.

The overall value of each possible projection is then shown in an optimal projection map. The optimal projection map is a color map in which for each combination of rotation and angulation, that is for each possible projection, an overall value is shown using a corresponding color or grey value. An example of a color map is shown in FIG. 7. In this color map for example the outcome for the normalized spatial angles of FIG. 4 is weighed with the outcome for the normalized directional difference angles of FIG. 6. This weighting function can for example be a multiplication. Reference 701 of FIG. 7 represent the normalized spatial angle outcome of FIG. 4. Because these regions were indicated non-complementary in terms of the normalized spatial angle, this is also the case for the overall parameter. Likewise, regions determined to be non-complementary in terms of directional difference angle (702) are also indicated non-complementary for the overall parameter. Using the generated color map, the user can then select a projection that is most optimal relative to projection I. This projection can then be used to obtain the second two-dimensional angiographic image that can be used for further calculations, for instance generating a three-dimensional reconstruction.

Figure 8:
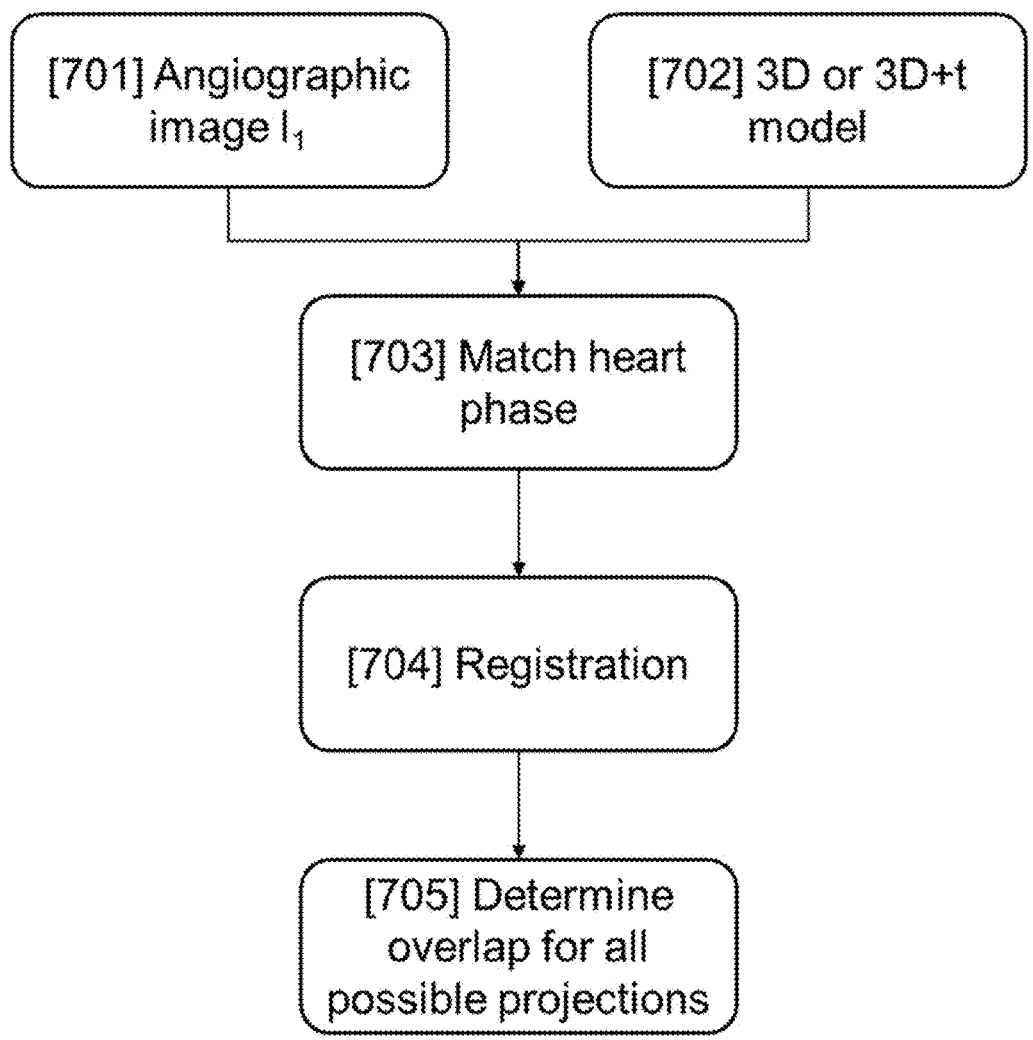
FIG. 8 shows a flowchart to obtain the overlap parameter.

Optionally, another parameter regarding overlap can be considered. Because multiple organs, particularly vessels, are present in the x-ray path from x-ray source to detector, those organs are projected on the image as well. Depending on the viewing perspective, these organs may overlap the object of interest. A certain projection is more optimal in case the overlap of surrounding vessels of the vascular system, for instance the coronary tree, is minimal. An example of an embodiment where organ overlap is used as a parameter to help determine optimality of the second projection is shown in FIG. 8.

For this overlap parameter, a 3D or 3D+time (3D+t) model of the vessel tree, for instance the coronary tree, is input at 702. The 3D model of the vessel tree can for instance be a generic centerline or lumen model obtained by averaging various segmented CT or MRI datasets. A generic 3D model can be available for each heart model (i.e. coronary dominant system).

When, for instance, a motion model is used to deform the 3D model extracted from CT data a 3D+t model is available at 702, representing the coronary morphology during the cardiac cycle. This can be done for instance as taught by Baka et al, "3D+t/2D+t CTA-XA registration using population based motion estimates", Demirci, Lee, Radeva, Unal (eds): MICCAI-STENT 2012, pp 64-71, where a method is proposed for building population based average and predicted motion from 4D CT datasets which is then used to perform 3D+t/2D+t registration based on distance minimization on one cardiac cycle. The complete subject matter of the publication referenced herein is incorporated by reference herein in its entirety. The first angiographic image I is input at 701. Preferably the heart phase of the angiographic image is matched to that of the 3D or 3D+t at 703. That is the 3D model represents one heart phase, whereas the two-dimensional angiographic image contains multiple heart phases. Aligning the heart phase ensures a better matching. In the case of a 3D+t model, the heart phase can be synchronized for instance using ECG either acquired by digitalizing the ECG signal acquired from the patients or retrieved by file transfer.

At 704, the processor determines how the 3D model corresponds to the two-dimensional angiographic image I. For this a rigid registration is performed between the 3D model and the two-dimensional angiographic image I as for instance taught by Guéziec et al, "Anatomy-Based Registration of CT-scan and Intraoperative X-ray Images for Guiding a Surgical Robot", IEEE Transactions on Medical Imaging, Vol. 17, No. 5, October 1998. Guéziec et al teaches a registration method that computes the best transformation between a set of lines in three space, the (intraoperative) X-ray paths, and a set of points on a surface. The complete subject matter of the publication referenced herein is incorporated by reference herein in its entirety.

Once the 3D model and the two-dimensional angiographic image I have been registered, the processor can determine at 705 which possible projections J contain overlap of surrounding vessels.

For each possible viewing direction corresponding to a certain perspective, for instance a simulated X-ray beam from the image source towards the section of interest in the 3D model, can be determined. In case of vessel overlap, a surrounding vessel of the 3D model will intersect the X-ray-beam.

For each possible projection, the amount of overlap can thus be determined. The views that contain overlap of surrounding vessels are less optimal than views without overlap.

This overlap parameter can for instance be combined with the already calculated parameters by adding the overlap parameter in the weighting function. This results in a color or grey level map that contains an overall measure for optimality consisting of a spatial angle parameter, a directional difference angle parameter as well as an overlap parameter.

Figure 9:
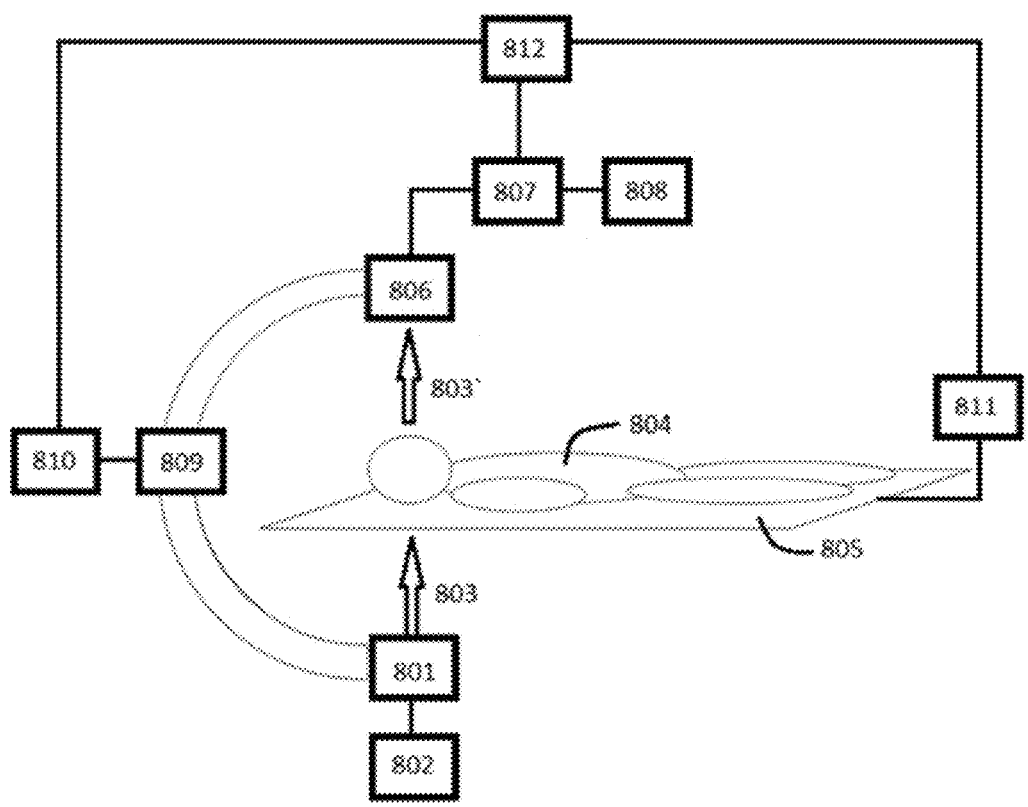
FIG. 9 shows an example of x-ray cinefluorographic unit block diagram in accordance with an embodiment herein.

The embodiment described herein can be used on a standalone system or included directly in, for instance, an x-ray fluorographic system or any other image system to acquire two dimensional angiographic images. FIG. 9 illustrates an example of a high-level block diagram of an x-ray cinefluorograpic system. In this block diagram the embodiment is included as an example how the embodiment could integrate in such system.

Portions of the system (as defined by various functional blocks) may be implemented with dedicated hardware, analog and/or digital circuitry, and/or one or more processors operating program instructions stored in memory.

The X-ray system of FIG. 9 includes an X-ray tubes 801 with a high voltage generator 802 that generates an X-ray beam 803.

The high voltage generator 802 controls and delivers power to the X-ray tube 801. The high voltage generator 802 applies a high voltage across the vacuum gap between the cathode and the rotating anode of the X-ray tube 801.

Due to the voltage applied to the X-ray tube 801, electron transfer occurs from the cathode to the anode of the X-ray tube 801 resulting in X-ray photon-generating effect also called Bremsstrahlung. The generated photons form an X-ray beam 803 directed to the image detector 806.

An X-ray beam 803 consists of photons with a spectrum of energies that range up to a maximum determined by among others the voltage and current submitted to the X-ray tube 801.

The X-ray beam 803 then passes through the patient 804 that lies on an adjustable table 805. The X-ray photons of the X-ray beam 803 penetrate the tissue of the patient to a varying degree. Different structures in the patient 804 absorb different fractions of the radiation, modulating the beam intensity.

The modulated X-ray beam 803' that exits from the patient 804 can be detected by the image detector 806 that is located opposite of the X-ray tube. This image detector 806 can either be an indirect or a direct detection system.

In case of an indirect detection system, the image detector 806 can include a vacuum tube (the X-ray image intensifier) that converts the X-ray exit beam 803' into an amplified visible light image. This amplified visible light image is then transmitted to a visible light image receptor such as a digital video camera for image display and recording. This results in a digital image signal.

In case of a direct detection system, the image detector 806 consists of a flat panel detector. The flat panel detector directly converts the X-ray exit beam 803' into a digital image signal.

The digital image signal resulting from the image detector 806 is passed through a digital image processing unit 807. The digital image processing unit 807 converts the digital image signal from 806 into a corrected X-ray image (for instance inverted and/or contrast enhanced) in a standard image file format for instance DICOM. The corrected X-ray image can then be stored on a hard drive 808.

Furthermore, the X-ray system of FIG. 9 consists of a C-arm 809. The C-arm holds the X-ray tube 801 and the image detector 806 in such a manner that the patient 804 and the adjustable table 805 lie between the X-ray tube 801 and the image detector 806. The C-arm can be moved (rotated and angulated) to a desired position to acquire a certain projection in a controlled manner using the C-arm control 810. The C-arm control allows for manual or automatic input for adjustment of the C-arm in the desired position for the X-ray recording at a certain projection.

The X-ray system of FIG. 9 can either be a single plane or a bi-plane imaging system. In case of a bi-plane imaging system, multiple C-arms 809 are present each consisting of an X-ray tube 801, an image detector 806 and a C-arm control 810.

Additionally, the adjustable table 805 can be moved using the table control 811. The adjustable table 805 can be moved along the x, y and z axis as well as tilted around a certain point.

A general unit 812 is also present in the X-ray system. This general unit 812 can be used to interact with the C-arm control 810, the table control 811 and the digital image processing unit 807.

An embodiment is implemented by the X-ray system of FIG. 9 as follows. A clinician or other user acquires an X-ray angiographic image of a patient 804 at a certain projection by using the C-arm control 810 to move the C-arm 809 to a desired position relative to the patient 804. The patient 804 lies on the adjustable table 805 that has been moved by the user to a certain position using the table control 811.

The X-ray image is then generated using the high voltage generator 802, the X-ray tube 801, the image detector 806 and the digital image processing unit 807 as described above. This image is then stored on the hard drive 808. Using this X-ray image, the general processing unit 812 calculates several parameters and provides the user with an optimal projection map that contains for each possible angiographic projection a measure for how optimal that projection would be as a second projection.

Using this outcome, the user can operate to acquire (or display) the image that belongs to this optimal projection and continue the procedure with the maximum amount of object information and the least amount of time and burden to the patient spent on finding that information. During such operations, the general unit 812 can show rotation and angulation angles of the arm of the imaging system that correspond to the optimal projection. The user can manually rotate the arm of the imaging system into a position that correspond to the chosen optimal projection or the C-arm control module 810 can automatically rotate the arm of the imaging system to the calculated optimal projection.

There have been described and illustrated herein several embodiments of a method and apparatus for determining optimal image viewing direction in terms of reduced foreshortening and relevancy of information. While particular embodiments have been described, it is not intended that the invention be limited thereto, as it is intended that the invention be as broad in scope as the art will allow and that the specification be read likewise. For example, the data processing operations can be performed offline on images stored in digital storage, such as a picture archiving and communication system (PACS) commonly used in the medical imaging arts. It will therefore be appreciated by those skilled in the art that yet other modifications could be made to the provided embodiments without deviating from its spirit and scope as claimed.

The embodiments described herein may include a variety of data stores and other memory and storage media as discussed above. These can reside in a variety of locations, for instance as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). The system may also include one or more storage devices, for instance as disk drives, optical storage devices and solid-state storage devices such as random access memory ("RAM") or read-only memory ("ROM"), as well as removable media devices, memory cards, flash cards, etc.

The devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ the variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer implemented method for guiding selection or acquisition of projection images of an object, the method comprising:
    a) providing a first two-dimensional image of the object which has been acquired from a first perspective orientation with reference to a coordinate system;
    b) defining at least one spatial angle parameter in the reference coordinate system that is indicative of a degree to which any candidate perspective orientation in the reference coordinate system complements the first perspective orientation;
    c) calculating values of the at least one spatial angle parameter of b) for a plurality of candidate perspective orientations;
    d) evaluating the values of the at least one spatial angle parameter for the plurality of candidate perspective orientations as calculated in c) to select one particular candidate perspective orientation that complements the first perspective orientation; and
    e) obtaining or acquiring a second two-dimensional image of the object which has been acquired from the one particular candidate perspective orientation as selected in d).

2. The method according to claim 1, wherein:
the evaluation of d) involves displaying a map that includes axes that represent coordinates of the coordinate system and indicia indicative of the values of the at least one spatial angle parameter at varying coordinates of the coordinate system, wherein the indicia represent a color or grey value that is associated with combinations of the coordinates.

3. The method according to claim 2, wherein:
the first perspective orientation and the plurality of candidate perspective orientations are expressed in the coordinate system and in a form of rotation and angulation of an x-ray machine that is configured to acquire the first two-dimensional image and the second two-dimensional image.

4. The method according to claim 1, wherein:
the values of at least one spatial angle parameter for the plurality of candidate perspective orientations as calculated in c) are based on at least one of:
    i) a three-dimensional angle between the first perspective orientation and a respective candidate perspective orientation,
    ii) a directional difference angle between a reference line in the first two-dimensional image and an epipolar line that corresponds to a respective candidate perspective orientation and that is projected on the first two-dimensional image, and
    iii) at least one value that represents degree of overlap between organs.

5. A method according to claim 1, wherein:
the at least one spatial angle parameter comprises a directional difference angle between a reference line in the first two-dimensional image and an epipolar line that corresponds to a respective candidate perspective orientation and that is projected on the first two-dimensional image.

6. The method according to claim 5, wherein:
the object is a tubular organ or comprises a region containing tubular organs, the reference line being the centerline of the tubular organ or organs.

7. The method according to claim 6, wherein:
the object comprises a plurality of tubular organs, the reference line is the centerline of at least part of the tubular organs, and the evaluating of d) employs a weighting function based on the direction difference angles for different parts of the plurality of tubular organs.

8. The method according to claim 1, wherein:
the at least one spatial angle parameter is represented by a value assigned to a three-dimensional angle between the first perspective orientation and a respective candidate perspective orientation, wherein the value assigned to a three-dimensional angle in the range at or less than 30° and at or higher than 150° is a minimum value corresponding to a least optimal perspective.

9. The method according to claim 1, wherein:
the object comprises a plurality of organs;
the at least one spatial angle parameter is based on at least one value that represents degree of overlap between organs; and
a 3D or 3D+t model of the plurality of organs is built or input for use in determining values that represent different degrees of overlap between organs to obtain corresponding projection images.

10. The method according to claim 9, wherein:
a registration is performed between the first two-dimensional image and the 3D or 3D+t model before determining the values that represent different degrees of overlap between organs.

11. The method according to claim 10, wherein:
the 3D model is a 3D+t model; and
two-dimensional angiographic images containing multiple heart phases are synchronized with the heart phases of the 3D+t model using an ECG signal before registration.

12. The method according to claim 9, wherein:
the candidate perspective orientations containing organ overlap are assigned values that correspond to a least optimal perspective, while the candidate perspective orientations containing little or no overlap are assigned values that correspond to a most optimal perspective.

13. The method according to claim 1, wherein:
angulation and rotation angles of the plurality of candidate perspective orientations are limited within a range of possible rotation and angulation angles of an apparatus used for acquiring the first and second two-dimensional images.

14. A system for guiding selection or acquisition of projection images of an object, the system comprising:
at least one processor; and
a memory coupled to the at least one processor, wherein the memory stores program instructions, wherein the program instructions are executable by the at least one processor to:
  a) provide a first two-dimensional image of the object which has been acquired from a first perspective orientation with reference to a coordinate system;
  b) define at least one spatial angle parameter in the reference coordinate system that is indicative of a degree to which any candidate perspective orientation in the reference coordinate system complements the first perspective orientation;
  c) calculate values of the least one spatial angle parameter of b) for a plurality of candidate perspective orientations;
  d) evaluate the values of the at least one spatial angle parameter for the plurality of candidate perspective orientations as calculated in c) to select one particular candidate perspective orientation that complements the first perspective orientation; and
  e) obtain or acquire a second two-dimensional image of the object which has been acquired from the one particular candidate perspective orientation as selected in d).

15. The system according to claim 14, wherein:
the evaluation of d) involves displaying a map that includes axes that represent coordinates of the coordinate system and indicia indicative of the values of the at least one spatial angle parameter at varying coordinates of the coordinate system, wherein the indicia represent a color or grey value that is associated with combinations of the coordinates.

16. The system according to claim 15, wherein:
the first perspective orientation and the plurality of candidate perspective orientations are expressed in the coordinate system and in a form of rotation and angulation of an x-ray machine that is configured to acquire the first two-dimensional image and the second two-dimensional image.

17. The system according to claim 14, wherein:
the object is a tubular organ or comprises a region containing tubular organs; and
the at least one processor is configured to identify a reference line representing a centerline of the tubular organ or organs.

18. The system according to claim 14, wherein:
the at least one spatial angle parameter is represented by a value assigned to a three-dimensional angle between the first perspective orientation and a respective candidate perspective orientation, wherein the value assigned to a three-dimensional angle in the range at or less than 30° and at or higher than 150° is a minimum value corresponding to a least optimal perspective.

19. The system according to claim 14, wherein:
the candidate perspective orientations that contain organ overlap are assigned non-complementary values for the spatial parameter, while the candidate perspective orientations that contain little or no overlap are assigned a complementary values for the spatial parameter.

20. The system according to claim 14, wherein:
the values of at least one spatial angle parameter for the plurality of candidate perspective orientations as calculated in c) are based on at least one of
  i) a three-dimensional angle between the first perspective orientation and a respective candidate perspective orientation,
  ii) a directional difference angle between a reference line in the first two-dimensional image and an epipolar line that corresponds to a respective candidate perspective orientation and that is projected on the first two-dimensional image, and
  iii) at least one value that represents degree of overlap between organs.

21. The system according to claim 14, further comprising:
an x-ray machine configured to acquire the first two-dimensional image.

22. The system according to claim 21, wherein:
the x-ray machine is further configured to acquire the second two-dimensional image.

23. The system according to claim 14, further comprising:
an angiographic apparatus with X-ray source and image intensifier located at opposite sides of an arm, the arm being movable at least according to a rotation angle and an angulation angle with reference to a patient to obtain two-dimensional images from different perspectives, the at least one processor including a data processing module being programmed to calculate rotation and angulation angles of the arm for obtaining optimal projection images.

24. The system according to claim 22, wherein:
the angiographic apparatus is configured to automatically or semi-automatically rotate the arm, or display user indications for manually rotating the arm, according to rotation and angulation angles calculated for obtaining an optimal projection image.

25. A non-transitory computer-readable storage medium having stored thereon executable instructions that, when executed by one or more processors of a computer system, cause the computer system to:
  a) provide a first two-dimensional image of the object which has been acquired from a first perspective orientation with reference to a coordinate system;
  b) define at least one spatial angle parameter in the reference coordinate system that is indicative of a degree to which any candidate perspective orientation in the reference coordinate system complements the first perspective orientation;

c) calculate values of the least one spatial angle parameter of b) for a plurality of candidate perspective orientations;
d) evaluate the values of the at least one spatial angle parameter for the plurality of candidate perspective orientations as calculated in c) to select one particular candidate perspective orientation that complements the first perspective orientation; and
e) obtain or acquire a second two-dimensional image of the object which has been acquired from the one particular candidate perspective orientation as selected in d).

26. The non-transitory computer-readable storage medium according to claim 25, wherein:
the evaluation of d) involves displaying a map that includes axes that represent coordinates of the coordinate system and indicia indicative of the values of the at least one spatial angle parameter at varying coordinates of the coordinate system, wherein the indicia represent a color or grey value that is associated with combinations of the coordinates.

27. The non-transitory computer-readable storage medium according to claim 25, wherein:
the first perspective orientation and the plurality of candidate perspective orientations are expressed in the coordinate system and in a form of rotation and angulation of an x-ray machine that is configured to acquire the first two-dimensional image and the second two-dimensional image.

* * * * *